Aug. 24, 1926.

A. PEARSON 1,597,106

ANTIKICK AUTO CRANK

Filed April 2, 1925

A. Pearson
INVENTOR.

BY Goldberg.
ATTORNEY.

Patented Aug. 24, 1926.

1,597,106

UNITED STATES PATENT OFFICE.

ARTHUR PEARSON, OF PORTLAND, OREGON.

ANTIKICK AUTO CRANK.

Application filed April 2, 1925. Serial No. 20,067.

My invention relates to anti-kick auto cranks, in which the spindle of the crank is provided with a ratchet wheel; a pawl engages said ratchet wheel and permits free rotation in one direction only.

The objects of my invention are to furnish a comparatively simple and inexpensive device which will prevent injury to the operator in case of back-fire in the motor.

Other objects and advantages are to be found in the construction and arrangement of parts as will be described in the specification, and particularly pointed out in the appended claims.

I attain these objects with the mechanism illustrated in the accompanying drawing, in which:—

Similar numerals refer to similar parts throughout the several views.

Figure 1:
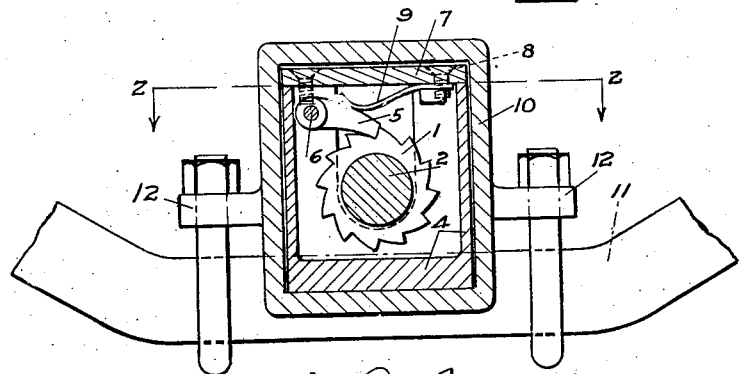
Fig. 1 is a sectional elevation of my device, the section line being indicated by 1—1 in Fig. 2.
Figure 2:
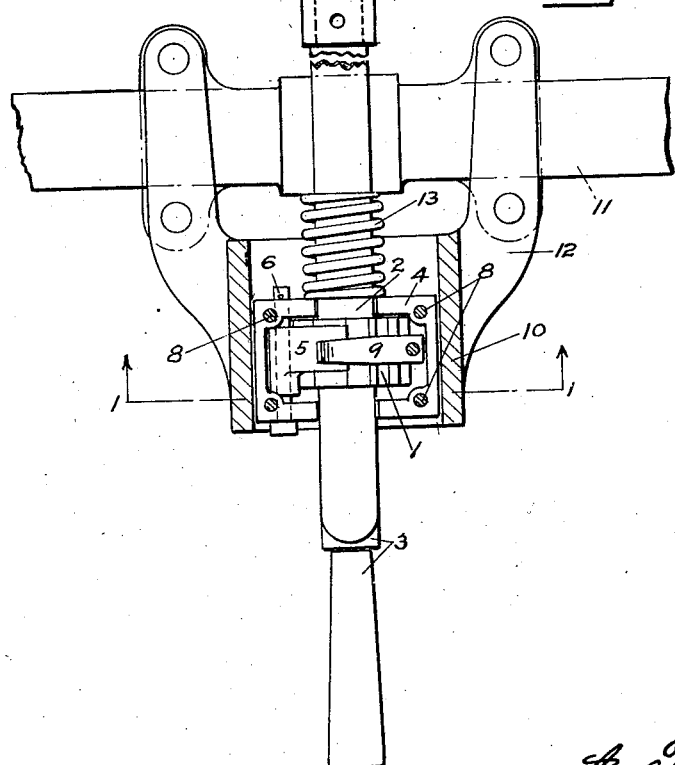
Fig. 2 is a plan view, also in section, the section line being indicated by 2—2 in Fig. 1.

A ratchet wheel 1 is integrally connected with the spindle 2 of the conventional automobile crank 3. The spindle with the ratchet wheel is then placed in a box 4, in the upper left corner of which is secured a pawl 5 by means of the pin 6, and said box 4 is closed by a cover 7. The screws which hold the cover 7 to the box 4 are indicated by the numerals 8. Attached to the underside of the cover 7, and pressing against the pawl 5, is a leaf spring 9. Since the spindle 2 requires freedom of movement in axial direction to engage and disengage the engine shaft, while at the same time the pawl 5 must be kept from rotating with the spindle 2, the box 4 is slipped into a square tube 10 which permits sliding but no rotation. The square tube 10 may be attached to the automobile frame 11 in any suitable manner, as for instance, by means of the lugs 12. With this arrangement the box can advantageously be used as counterbearing for the customary coil spring 13.

In operation the crank is turned in clockwise direction precisely like any other crank, the ratchet wheel will rotate readily past the pawl. However, should back-fire in the engine attempt to drive the crank counter clockwise, this would be effectively resisted by the pawl which engages the teeth of the ratchet wheel. It is, of course, necessary that the construction throughout must be strong enough to withstand the heavy stresses which are produced by the backfire of an engine.

Having thus described my invention, it will be seen that my objects have been accomplished and, though I have shown the preferred form of construction, I reserve to myself the right to make minor changes, providing I do not contravene the spirit and principle of my invention.

I claim:

1. In a device of the character described, the combination of a horizontally disposed square tube, lugs extending from the side walls of the square tube in horizontal direction past one end of said tube, said lugs being firmly attached to the front member of an automobile frame, a square box reciprocating in said square tube, said box having a removable cover, the spindle of an automobile crank traversing said box and sliding in the axial direction of the square tube, said box sliding in unison with the spindle, and means in the box cooperating with the spindle to stop rotation of said spindle in counter clockwise direction.

2. In a device of the character described, the combination of a square tube stationarily affixed to the front member of an automobile frame, a square box slidably mounted in said square tube, said box having a removable cover, the spindle of an automobile crank traversing the box, a ratchet wheel firmly attached to the spindle, said ratchet wheel being enclosed in the box, said box moving with the spindle in the square tube, a pawl pivotally mounted in the box and engaging the ratchet wheel continuously, and a leaf spring attached to the under side of the cover and pressing against the pawl.

Signed by me at Portland, Oregon, this 26th day of March, 1925.

A. PEARSON.